July 31, 1956

C. RUSSELL ET AL 2,756,593

SHIP'S LOG

Filed April 18, 1951

*INVENTORS*
GORDON S. HUNTER
CHARLES RUSSELL
CHARLES E. GREGORY

BY C. R. Miranda

*ATTORNEY*

July 31, 1956
C. RUSSELL ET AL
2,756,593
SHIP'S LOG
Filed April 18, 1951
2 Sheets-Sheet 2
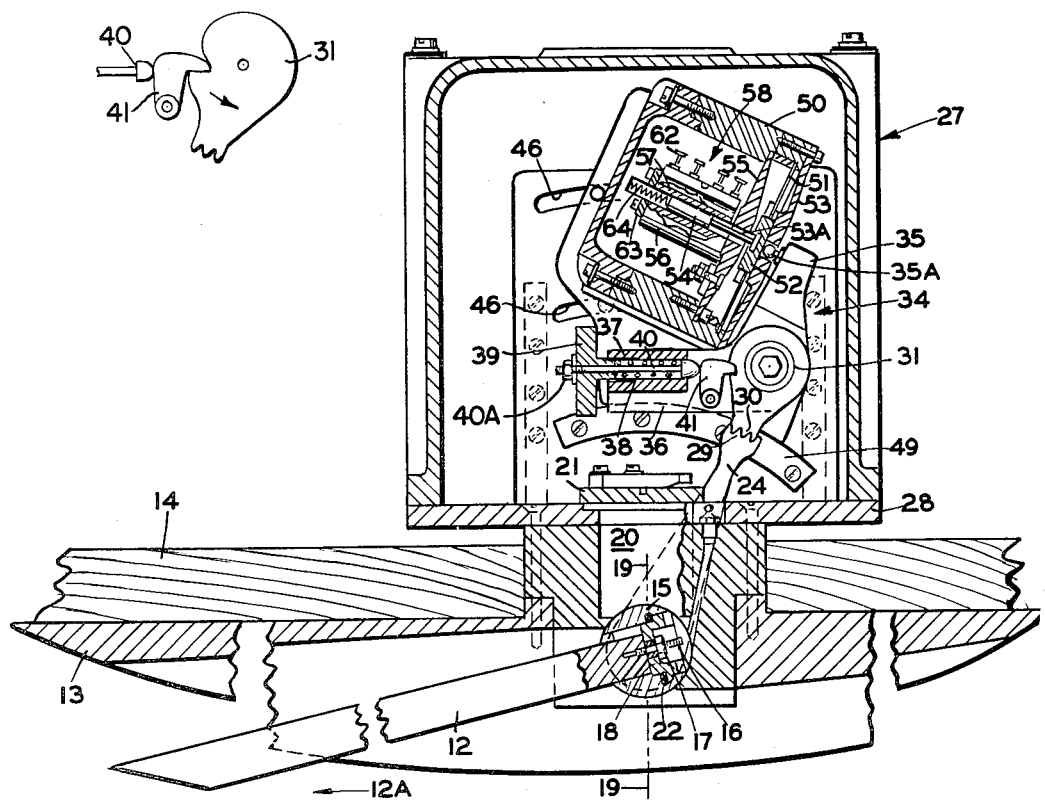
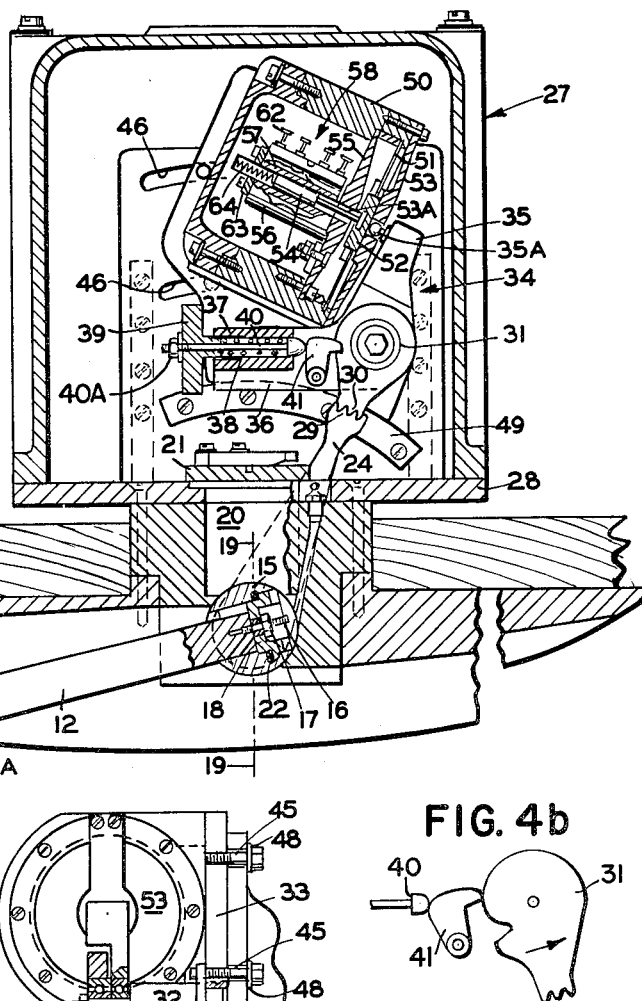
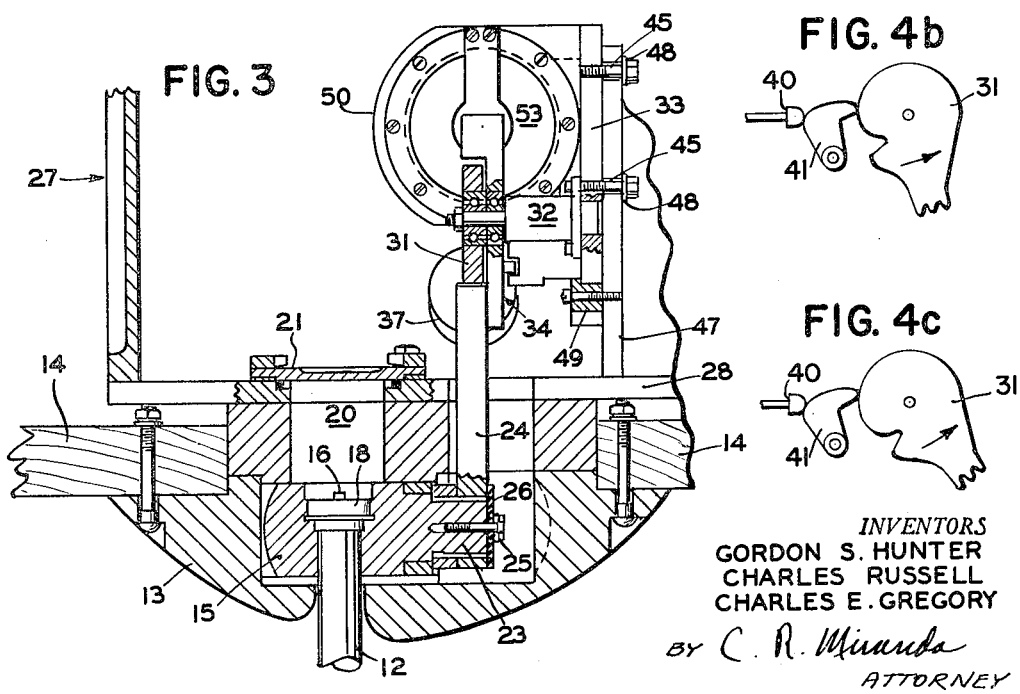
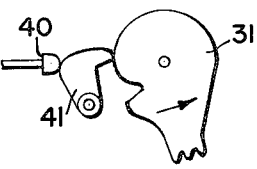
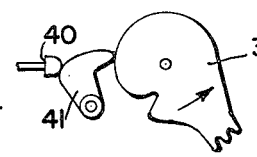
INVENTORS
GORDON S. HUNTER
CHARLES RUSSELL
CHARLES E. GREGORY
BY C. R. Miranda
ATTORNEY

United States Patent Office 2,756,593
Patented July 31, 1956

2,756,593

SHIP'S LOG

Charles Russell, Coytesville, N. J., Gordon S. Hunter, Yonkers, N. Y., and Charles E. Gregory, East Paterson, N. J., assignors to Bendix Aviation Corporation, Teterboro, N. J., a corporation of Delaware Application April 18, 1951, Serial No. 221,614

8 Claims. (Cl. 73—186)

This invention relates to indicating systems and more particularly to an underwater speed log for indicating the speed of water craft.

Systems or means for measuring the speed of water borne craft must take into consideration the non-linear relation between the dynamic pressure of water and the craft's velocity. Since the dynamic pressure of water is substantially proportional to the square of the craft's velocity, many systems have been proposed which convert the aforementioned non-linear relationship into a linear relation for measuring craft speed on a uniformly spaced or linear dial. These systems, ordinarily, employ a Pitot tube arrangement which measures the dynamic pressure of water together with complex rectifying means for resolving the non-linear pressure into linear motion. Inherently, the rectifying means are complicated arrangements, difficult to maintain in proper operating condition so as to require frequent recalibration. In addition, the openings in the Pitot tubes are subjected to clogging by foreign matter.

The present invention contemplates an electrical servo indicating system for measuring craft speed by means of a displaceable pressure vane or strut projecting into the water. The force exerted against the strut by the dynamic pressure of the water is converted into an electrical voltage by a variable output transformer or transmitter signal generator. A conversion or rectifying member in the form of a spring diaphragm resolves the non-linear force against the strut into linear displacement of the latter and into linear actuation of the signal generator, whereby the latter develops a signal substantially proportional to the craft's velocity. A reversible two-phase motor is energized by the output of the signal generator to move a pair of pointers relative to a speed dial having uniformly spaced indicia thereon. Follow-up means are provided in the form of a cam-actuated signal generator to produce an output equal in magnitude and opposite in phase to the output from the transmitter signal generator. Thus, when the craft attains a constant velocity the follow-up signal cancels the transmitter signal so that the pointers are stopped at their proper position relative to the dial to indicate the operating speed of the craft. Novel overload release means are also provided to prevent damage from occurring to the strut and spring diaphragm, when the former encounters debris which exert too great a load on the strut.

Accordingly, an object of the present invention is to provide a novel electrical servo speed log for water craft for accurately measuring the speed of the craft.

Another object is to provide a novel speed log having a pressure vane or strut, the non-linear force acting thereon being transmitted to a yieldable member which rectifies the non-linear force into linear deflection of the strut.

A further object is to provide a novel speed log wherein a transmitter signal generator develops a linear output signal which is proportional to the first power of the boat's velocity.

Still another object is to provide a novel speed log wherein means are provided for effecting linear indications of a craft's speed on an indicator in response to the non-linear force acting on a strut measuring the craft's speed.

A still further object is to provide a novel speed log wherein overload release means are provided for preventing damage to the system upon an overload on the strut.

Another object is to provide a novel electrical servo speed log wherein the force of water against a protruding strut is converted into a linear electrical quantity by a conversion element actuated by the strut.

A further object is to provide a novel and reliable underwater speed log for marine vessels.

The foregoing and other objects and advantages of the present invention will appear more fully hereinafter from a consideration of the detailed description which follows, taken together with the accompanying drawings wherein one embodiment of the invention is illustrated by way of example. It is to be expressly understood, however, that the drawings are for the purposes of illustration only, and are not to be construed as defining the limits of the invention.

In the drawings wherein like reference numerals refer to like parts,

Fig. 2 is a front elevational view partly in cross section of the master speed transmitter forming part of the present invention;

Fig. 3 is a side elevational view of the master speed transmitter; and

Figs. 4a, 4b and 4c are a detail of the overload release mechanism of Figs. 1 and 2 showing the relative latch and notch positions for three different craft velocities.

Figure 1:
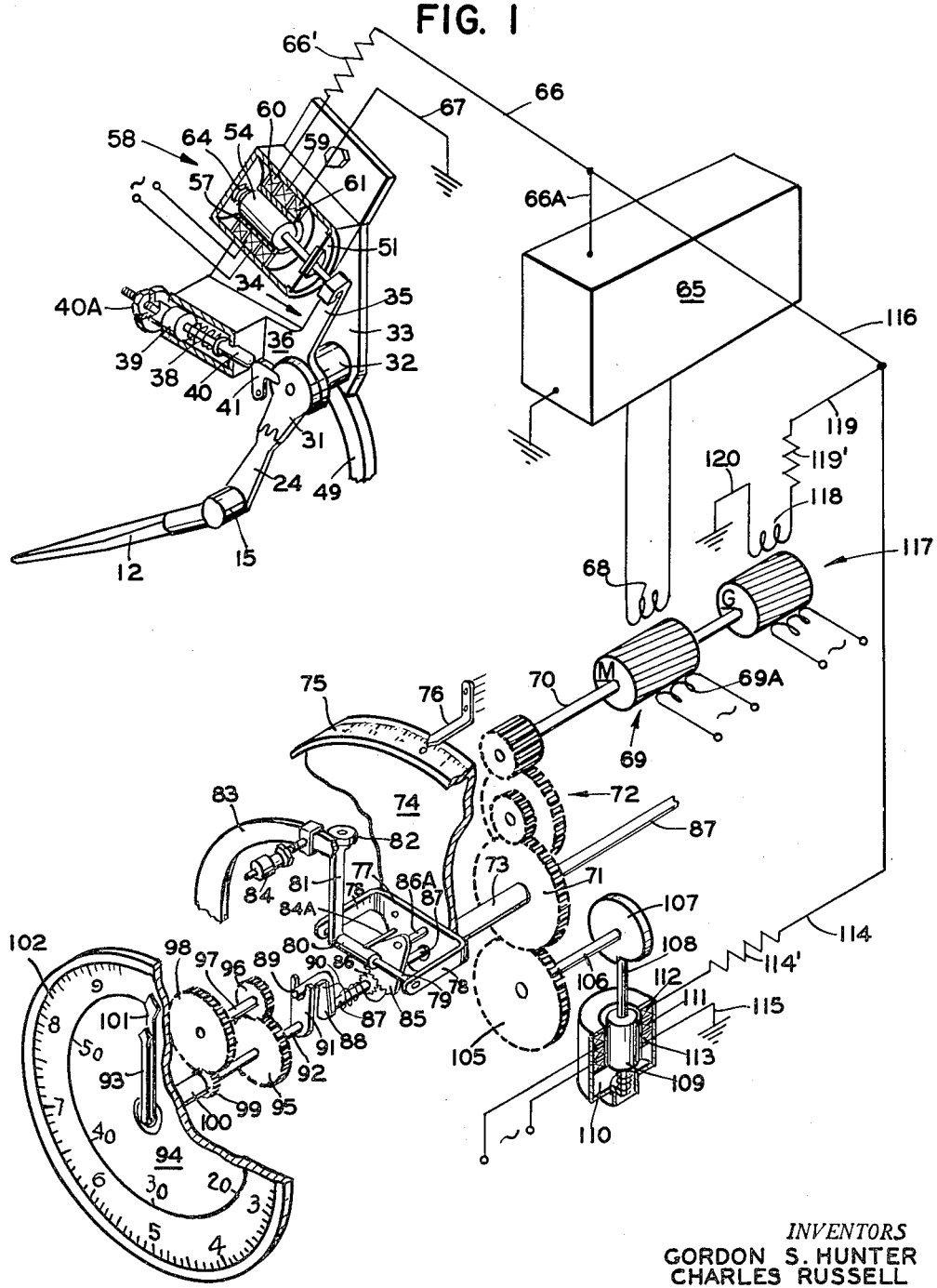
Fig. 1 is a diagrammatic illustration, in perspective, of the novel speed log comprising the present invention.

Referring now to Figures 1 and 2 of the drawings, the master speed transmitter of the present invention is shown as comprising a triangular shaped sensing strut or pressure vane 12 (a portion of which is shown) supported in an aluminum casting 13 fixed to the hull 14 of the craft whose speed is to be measured. The strut is positioned as near the center line of the vessel as possible and is located far enough aft to be in solid water at top speed and far enough forward to be free from propeller disturbances. The casting 13 has suitably shaped hollow portions therein which allow the strut 12 to be folded into the casting when not in use or when the load on the strut exceeds a predetermined value, as by encountering debris or other obstructions. The direction of water flow relative to the hull and strut is shown by the arrow 12A. Strut 12 is supported in a hollowed out portion of a shaft 15 pivotally mounted in casting 13, by means of a threaded bolt 16 and nut 17, a portion of the latter engaging a cap 18. Cap 18 has an externally threaded portion (not shown) which engages an internally threaded portion in the hollowed out portion of the shaft, whereby fastening of strut 12 to the cap results in fixing the strut to the shaft. When the strut is aligned with the centerline 19, the strut may be disengaged by unthreading cap 18 by a suitable tool which is inserted through a chamber 20 formed in the upper section of the casting. A cover 21 normally seals the upper chamber 20 and is removed when the strut is to be disengaged from the shaft 15. Suitable sealing means 22 are provided for preventing leakage of water past the shaft 15 and cap 18.

Shaft 15 has an extended portion 23 of reduced diameter (Fig. 3) which accommodates thereon a sector arm 24 which is secured to the shaft by means of a threaded bolt 25 and a retainer plate 26. Sector arm 24 extends through the casting and hull of the craft into a casing 27 (Fig. 2) fastened to a mounting plate 28 which is in turn secured to the casting. The upper portion of arm 24 terminates in a gear segment 29 which is normally in mesh with a gear segment 30 formed at the end of a sector arm 31 supported on the reduced portion of a shaft 32 (Fig. 3) fixed to an adjustable plate 33. The reduced portion of shaft 32 also accommodates a bellcrank 34 having a pair of arms 35 and 36. Arm 35 has a pin 35A projecting from one side thereof. Sector arm 31 and bellcrank 34 are movable with respect to shaft 32 by means of the ball bearing construction shown.

Arm 36 carries an overload release mechanism comprising a substantially hollow cylinder 37 integral with the arm and movable therewith. Seated in cylinder 37 is a coil spring 38 and a spring retainer member 39 which urge a plunger 40 to the right, as seen in Figs. 1 and 2. One end of plunger 40 engages a latch 41 which is normally seated, as shown in Fig. 4a, in a notch formed in sector arm 31. By reason of the foregoing, the bellcrank 34 and sector 31 are normally locked together and move relative to shaft 32. Spring 38 may be stressed by turning nut 40A to exert a predetermined load on the latch 41. It may be readily understood that sector 31 and bellcrank 34 will move in unison on shaft 32 upon deflection of the strut. The relative positions of the latch and notch for a high craft velocity are shown in Fig. 4b. However, if the load on strut 12 exceeds a predetermined maximum value the latch and notch are shaped so that latch 41 will slip out of the notch and thereby effect disengagement of sector 31 from bellcrank 34 as shown in Fig. 4c. In this manner, gear segments 29 and 30 will come out of mesh and strut 12 will fold back into the casing 13.

A pair of bolts 45 are threaded in movable plate 33 and the smooth shank portions thereof ride in a pair of concentric arcuate slots 46 formed in an upstanding supporting plate 47 secured to mounting plate 28. Lockwashers 48 are seated on bolts 45 for preventing unthreading of the bolts. Plates 33 and 47 are locked together by turning the bolts until the lockwashers are pressed into engagement with plate 47. Plate 33 may be adjusted to predetermined positions relative to plate 47 by unthreading bolts 45 and moving plate 33 relative to plate 47. The lower edge of plate 33 moves along a graduated bracket 49 secured to the supporting plate. In order to adapt the speed log to lower or higher speeds, it is necessary to increase or decrease the strut trail angle. This is accomplished by moving plate 33 along bracket 49. Since shaft 32 is rigidly fastened to plate 33, movement of the latter results in moving both sectors 24 and 31, and strut 12, through whatever angle is indicated by the track graduations. In practice, the strut 12 is maintained at a trail angle of 30 degrees with the casting 13, this angle being the zero or null position of the strut.

Secured to movable plate 33 is a hollow cylindrical casing 50 which has supported therein a yieldable diaphragm spring 51 having an opening for accommodating a circular insert 52. A retainer member 53 forms one wall of casing 50 and serves to preload diaphragm 52 slightly. Retainer member 53 has an opening formed therein which permits the ball end of pin 35A to engage the center of insert 52. A recess is formed on the other side of insert 52 for seating one end of a plunger 53A which has secured at its other end a cylindrical soft iron core member 54. Plunger 53A passes through an opening formed in a circular mounting bracket 55 fastened to the casing, the bracket having secured thereto a bushing 56 which supports therein a ceramic core 57 forming part of a transmitter signal generator 58. Signal generator 58 is of a well known type of variable output transformer which comprises a primary winding 59 (Fig. 1) connected to a source of alternating current and a pair of secondary windings 60 and 61. As best seen in Fig. 1, the primary and secondary windings are supported on core 57 with the primary winding 59 located between the secondary windings 60 and 61. Four terminal posts 62, seen in Fig. 2, may be connected by conductors (not shown) to their respective windings. Core 57 has an opening formed longitudinally thereof in which the iron core 54 travels, and is sealed at one end by a spring housing 63. Seated in housing 63 is a spring 64 which urges core 54 and plunger 53A to the right (Fig. 2). Spring 64 normally maintains the iron core centered with respect to the primary and secondary windings for a purpose to be now explained.

As previously indicated, primary winding 59 is connected to a source of alternating current and is inductively coupled with secondary windings 60 and 61. The latter windings are connected in series opposed relation so that the voltages therein buck each other to effect a substantially zero output when core 54 is centered with respect to the windings. Upon displacement of core 54 from its centralized position, the secondary winding having the greater portion of iron in it will produce a greater voltage than that produced in the other secondary winding. The voltage or signal from the predominating secondary winding will be of a phase and magnitude determined by the direction and amount of displacement of core 54 from its centralized position.

The force exerted on strut 12 by the pressure of the water is substantially proportional to the square of the boat's velocity. Therefore, the change in force against the strut varies non-linearly upon linear changes in speed of the craft so as to deflect the strut in a non-linear manner. If the strut is deflected non-linearly, the bellcrank 34 and pin 35A will be also moved in like manner. However, diaphragm spring 51 has a deflection characteristic which resolves a non-linear force exerted thereon into linear deflection of the spring. The deflection curve of the diaphragm 51 substantially follows the linear curve of the craft's velocity so that the force exerted on the strut 12, which follows a square law relation, is converted or rectified by the diaphragm into linear movement of iron core 54 to effect an output from signal generator 58 which is approximately proportional to the craft's velocity. Since the motion of strut 12 is resisted by diaphragm spring 51, the strut will be deflected in a linear manner. Suitable diaphragm springs having the desired deflection-force characteristic wherein the deflection of the diaphragm spring is substantially proportional to the square root of the force applied centrally of the diaphragm are disclosed in U. S. Patents 2,481,782; 2,481,752; and 2,481,772, the aforesaid patents being assigned to the same assignee as the present application. A suitable diaphragm spring having the aforesaid square-root deflection-force characteristic is identified as part No. 833,741 of the type 1589 carbon pile regulator manufactured by the Eclipse-Pioneer Division of Bendix Aviation Corporation, Teterboro, New Jersey.

As is understood by those skilled in the diaphragm art, whether a diaphragm deflection rate is linear or non-linear and the extent or calibration curve shape for a non-linear deflection rate, depends upon various design factors such as the composition of the material, the grain structure, method of heat treatments, uniform or non-uniform thickness, number and geometry of convolutions, if any, etc.

The output of transmitter signal generator 58 is fed via a series resistor 66' to a conventional phase sensitive servo amplifier 65, shown as a box in Fig. 1, by way of conductors 66 and 67 connected to secondary windings 60 and 61, respectively, and a conductor 66A. Connected to receive the output of amplifier 65 is the variable phase winding 68 of a reversible two phase induction motor 69 having a fixed phase winding 69A connected to a suitable source of alternating current. The motor 69 is driven in one direction or the other at a speed depending upon the phase and amplitude of the signal from transmitter generator 58. Motor shaft 70 drives a relatively large gear 71 through a reduction gear train generally designated by the numeral 72. Gear 71 is carried by a hollow shaft 73 which is fixed at one end to an annular disc 74, only a portion of which is shown. Disc 74 has a flange-like portion 75 formed at the periphery thereof which bears indicia which read in knots. A fixed index 76 cooperates with the indicia on portion 75 for reading the indicated or uncompensated speed of the craft. Fixed to disc 74 and movable therewith is a substantially U-shaped bracket 77 forming part of a compensation mechanism, the purpose of which is to be described presently.

Bracket 77 includes a pair of spaced parallel arms 78 which support therebetween a shaft 79 having a sleeve 80 thereon movable with respect to the shaft. Fixed at right angles to sleeve 80 is a follower arm 81 which carries at one end a cam roller 82 for engaging one side of a deformable cam ring 83, a portion of which is shown. Mounted at predetermined spaced intervals along the ring 83 are adjusting screws 84 (only one of which is shown) which serve to adjust the shape of the ring so as to present a desired and predetermined contoured surface. Projecting from sleeve 80 and secured thereto is a pin 84A which engages the edge of a sector 85 having a toothed portion formed at one end thereof. Sector 85 is pivotally mounted on a shaft 86A which is fixed to the bracket 77. The toothed portion of sector 85 is in meshing engagement with a pinion 86 integral with a shaft 87 which passes through an opening formed in bracket 77 and through the hollow shaft 73. Shaft 87 moves independently of hollow shaft 73, there being no rigid connection therebetween. An L-shaped link 88 is fastened to the forward end of shaft 87 and includes a toe portion 89 formed at right angles thereto. A spring 90 is disposed on a portion of shaft 87 and the ends thereof engage link 88 and sector 85 so as to normally urge the sector in a clockwise direction. Part of toe portion 89 is positioned in an open ended slot formed in an upstanding link 91 fixed to one end of a shaft 92. Shaft 92 carries at its other end a pointer 93 which moves relative to a speed indicator dial 94 marked off in uniformly spaced increments of 10 units so as to read from zero to sixty. Fastened to shaft 92 is a gear 95 which meshes with a pinion 96 on a shaft 97. A gear 98 is fixed to the other end of shaft 97 and is in meshing engagement with a pinion 99 formed on a hollow sleeve or shaft 100 which is coaxial with shaft 92. A pointer 101 is carried by shaft 100 and moves relative to a second dial 102 which is concentric with dial 94. The gear ratio of the gears interconnecting shafts 92 and 100 is such that the pointer 101 makes six revolutions for every revolution of pointer 93. Accordingly, the particular arrangement of indicia on dials 94 and 102 provides indications of craft speed in knots from zero to sixty.

The compensation mechanism described hereinabove, is incorporated in the present system to compensate for errors which may arise due to dissimilarity in the pressure flow relationship of the same type of craft. Since the diaphragm spring 51 is manufactured as a standard item for a particular type craft and crafts of the same type are not always identical, some error in the system will arise to affect the accuracy of speed indications. In addition, the diaphragm spring itself may vary slightly from a desired deflection characteristic caused in the manufacture thereof.

In practice, the present speed log is installed in the craft and the latter is given a trial run. If the speed indications vary slightly from the actual velocity of the craft, it is a simple matter to compensate this error by means of the adjustable cam ring and cam roller of the compensation mechanism. For better understanding of this feature of the invention, let it be assumed that the craft is operating at a speed of 20 knots. For the reasons set forth above, pointers 93 and 101 may indicate a speed of 19.5 knots rather than 20 knots. Following operation of the craft from zero to 20 knots, it may be seen that the output signal from signal generator 58 effects angular displacement of motor shaft 70 in the proper direction to angularly displace hollow shaft 73. Since disc 74 is fastened to shaft 73 the former will be angularly displaced an amount equal to the angular displacement of the latter. Accordingly, index 76 will indicate a reading of 19.5 knots. Motion is transmitted from bracket 77 to shaft 87 through the sector 85 and pinion 86 on the shaft. Bracket 77 and shaft 87 normally rotate in unison because sector 85 and shaft 87 are locked together by means of the toothed portion of the sector and pinion 86. In other words, sector 85 will not drive pinion 86 upon displacement of hollow shaft 73, because the spring 90 urges the sector against pin 84A. Pointers 93 and 101 will be driven by the intermediate mechanism heretofore described, to indicate 19.5 knots which is the same reading as indicated by index 76. In the above assumption, cam ring 83 was assumed to be flat and therefore pin 84A did not exert a torque tending to move the sector in a counter-clockwise direction. With the craft travelling at 20 knots the bracket 77 and shaft 87 will have been displaced a predetermined amount in a clockwise direction. Pointers 93 and 101 are displaced to the corrected reading of 20 knots, by turning the adjusting screw 84 nearest the displaced position of the cam roller 82 so as to distort the adjacent portion of the cam ring 83. Since the cam ring is bent, outwardly in this case, arm 81 will be moved a predetermined amount in a clockwise direction about shaft 79 to move sleeve 80, and thereby force pin 84A against sector 85 so as to angularly displace the latter in a counterclockwise direction. Sector 85 being in mesh with pinion 86 will rotate shaft 87 and consequently, pointers 93 and 101, whereby the latter will then indicate a reading of 20 knots. It is to be noted that index 76 will still indicate the uncorrected reading of 19.5 knots. By following the procedure outlined above, it is readily apparent that the cam ring 83 may be contoured by the adjusting screws 84 to compensate for errors which may arise in the cases heretofore mentioned.

Connected for meshing engagement with large gear 71 is a gear 105 fixed to one end of a shaft 106. Fastened to the other end of shaft 106 is a disc-like cam 107 having a contoured cam surface. The contoured surface cam 107 is shaped so that the increase in height of the cam surface is linear with respect to the angular displacement of the cam and approximates the linear velocity of the craft. The cam 107 makes one full revolution for every revolution of shaft 73. Contacting the cam surface of disc 107 is a follower rod 108 which has fastened to one end thereof a soft iron core 109 of a follow-up signal generator 110 which is identical in construction with the transmitter signal generator 58. Follow-up signal generator 110 differs from transmitter signal generator 58 insofar as the former generator does not have a spring diaphragm secured within its casing.

Signal generator 110 has a primary winding 111 connected to a suitable source of alternating current and is wound on a ceramic core. A pair of secondary windings 112 and 113 are also wound on the ceramic core and are connected in series opposed relation so that the voltages therein normally buck each other when core 109 is centered. Due to the direction of rotation of gear 105, the output signal of follow-up signal generator 110 is opposite in phase to the signal from transmitter signal generator 58. Since cam 107 has a linear rise which approximates the craft's velocity, and is drivably connected to motor 69, the signal from generator 110 will be equal in amplitude from the signal from the transmitter signal generator. The output of generator 110 is algebraically added to the signal from the transmitter signal generator by way of a series resistor 114′ and conductors 114 and 115 which are connected to the secondary windings, and conductor 116 connected to conductor 66A. In this manner, the transmitter signal is canceled by the follow-up signal to de-energize motor 69 when the pointers 93 and 101 indicate a speed corresponding to the speed of the craft.

In order to provide for dead beat control to prevent hunting, the system includes a rate generator 117, the armature of which is directly connected with the motor shaft 70 to produce a rate signal. The rate signal from output winding 118 of rate generator 117 is algebraically added to the transmitter and follow-up signals by way of a series resistor 119' and conductors 119 and 120 to prevent overrunning of the motor 69 in a manner well known to those skilled in the art.

A plurality of synchro transmitters may be connected for actuation by shaft 87 in order to supply information to a repeater and/or provide similar information to the craft's fire control equipment.

Considering the operation of the novel speed log thus far described, let it be assumed that the craft is travelling at a speed of 15 knots. Strut 12 will have been displaced upwardly from its reference null position the proper amount, and the pointers indicate a speed of 15 knots. If the craft begins to accelerate to attain a speed of 20 knots, strut 12 will be displaced upwardly from the previous position. As a result, iron core 54 will be displaced to the left from its previous position to effect a greater voltage from secondary winding 60. The differential output from the secondary windings will be increased and amplified by amplifier 65 to energize motor 69 thereby effecting movement of the pointers relative to the dial faces through the compensation mechanism described. Follow-up cam 107 in turn will be angularly displaced to move iron core 109 from its previous position, whereby signal generator 110 will effect an output equal in amplitude and opposite in phase to the output from transmitter signal generator 58 to cancel the latter output. Thus, the pointers will be stopped at a position to indicate 20 knots on the dial when the craft attains the desired speed.

Let it be assumed that the speed of the craft is decreased to 16 knots from its previous speed of 20 knots. The strut 12 in this assumption, moves dowwardly because of reduced pressure thereon, thereby causing iron core 54 in transmitter signal generator 58 to move closer to its centralized position to decrease the output from secondary windings 60 and 61. Motor shaft 70 will be driven in an opposite direction because the output from follow-up signal generator 110 is of opposite phase and of a greater amplitude than the output from the transmitter signal generator 58. Of course, it is to be understood that amplifier 65 contains a discriminating element which permits signals of opposite phase to be amplified so that motor shaft 70 is driven in opposite directions. As the motor angularly displaces cam 107 in a direction to center iron core 109, the follow-up signal generator 110 will develop an output signal equal in amplitude to the transmitter output, thereby causing motor 69 to stop with the system in equilibrium, and the pointers indicating 16 knots.

It will now be apparent that the present invention provides an electrical speed log which provides novel means for rectifying the non-linear force acting on a pressure actuated vane into linear actuation of a signal generator to effect linear indications of speed of water craft.

Although one embodiment of the invention has been illustrated and described in detail, it is to be expressly understood that the invention is not limited thereto. Various changes may be made in the design and arrangement of the parts without departing from the spirit and scope of the invention as will now be understood by those skilled in the art.

We claim:

1. In a system of the class described for use on water-borne craft, a velocity measuring strut adapted to be mounted on the craft for projection into the water and displaceable upon changes in craft velocity, the dynamic pressure of water on said strut varying non-linearly with changes in craft velocity, a signal generator having a first part and a second part movable with respect to said first part, and spring means having a non-linear deflection characteristic interposed between said strut and said movable part of said signal generator for drivably connecting said strut to said movable part of said signal generator to provide for linear movement of said movable part in response to changes in craft velocity producing movement of said strut.

2. In velocity sensitive apparatus for use on water-borne craft, a velocity measuring strut adapted to be mounted on the craft for projection into the water and displaceable upon changes in craft velocity, the dynamic pressure of water on said strut varying non-linearly with changes in craft velocity, a diaphragm spring having a non-linear deflection characteristic connected for constraining displacement of said strut linearly with changes in craft velocity, and a signal generator operable by said strut to provide a signal which is substantially a linear function of craft velocity.

3. In a velocity responsive system for use on water-borne craft, a velocity sensing strut adapted to be mounted on the craft for projection into the water and displaceable upon changes in craft velocity, the dynamic pressure of water on said strut varying non-linearly with changes in craft velocity, motion transmitting means adapted to extend through the hull of said craft and connected to transmit motion of said strut within said craft, a signal generator having a first part and a second part movable relative to said first part, and a diaphragm spring having a non-linear deflection characteristic for drivably coupling said motion transmitting means to said movable part of said signal generator to provide for linear movement of said movable part in response to changes in craft velocity producing movement of said strut.

4. In a velocity responsive system for use on water-borne craft, a velocity sensing strut adapted to be mounted on the craft for projection into the water and displaceable upon changes in craft velocity, the dynamic pressure of water on said strut varying non-linearly with changes in craft velocity, motion transmitting means adapted to extend through the hull of said craft and connected to transmit motion of said strut within said craft, a variable output signal generator positioned within the craft and including a stationary part and a movable part, said movable part being adapted to develop signals in said stationary part which have a magnitude bearing a substantially linear relationship to the extent of movement thereof, and a non-linear diaphragm spring drivably connecting said motion transmitting means to said movable part to provide for linear movement of said movable part in response to changes in craft velocity producing movement of said strut.

5. In a system of the class described for use on water-borne craft, a velocity measuring strut adapted to be mounted on the craft for projection into the water and displaceable upon changes in craft velocity, the dynamic pressure of water on said strut varying non-linearly with changes in craft velocity, a diaphragm spring within the craft and connected for constraining motion of the strut, said diaphragm spring having a non-linear deflection characteristic providing substantially linear displacement of said strut with changes in craft velocity, signal generator means controlled by said diaphragm spring to provide a signal which is substantially a linear function of change in craft velocity, a motor operable by said signal, an indicator for indicating craft velocity, and means responsive to the operation of said motor for operating said indicator, said last-mentioned means including means for automatically correcting the operation of said indicator to compensate for non-linear variation in said signal with change in craft velocity.

6. In speed responsive apparatus for water-borne craft, a movable speed-sensing strut adapted to be mounted on the craft for projection into the water and displaceable by the dynamic pressure of the water as a function of the craft velocity over the normal operating range of craft velocities, the dynamic pressure of the water on said strut increasing with increased craft velocity, a movable first member, a movable second member connected for movement by said strut, means for driving said first member by said second member in response to displacement of said strut by the water pressure below a predetermined displacement magnitude and for releasing said first member from the influence of said second member when the displacement of said strut reaches said predetermined magnitude, said means including a latch carried by one of said members, the other of said members having a notch therein, and means for holding said latch in said notch to hold said members in driving relation only when the pressure on said strut is below said predetermined magnitude.

7. In a speed log for water-borne craft, a movable speed-sensing strut adapted to be mounted on the craft for projection into the water and displaceable by the dynamic pressure of the water as a function of the craft velocity over the normal operating range of craft velocities, the dynamic pressure of the water on said strut increasing with increased craft velocity, a movable first member, a latch pivotally mounted on said member, biasing means for said latch, a movable second member connected for movement with said strut and having a notch therein shaped to receive said latch under the force of said biasing means to provide a motion transmitting connection between said strut and said first member when the displacement of said strut by the water pressure is below a predetermined displacement magnitude and to release said latch from said notch when the displacement of said strut reaches said predetermined magnitude.

8. In a speed log for water-borne craft, a movable strut adapted to be mounted on the craft for projection into the water and displaceable with changes in craft velocity, the dynamic pressure of the water on said strut increasing with increased craft velocity, a shaft, a member rotatably mounted on said shaft and connected for rotation by said strut, said member having a notch formed therein, an arm rotatably mounted on said shaft, a latch pivotally mounted on said arm and movable into and out of said notch, a movable plunger positioned on said arm and engaging said latch, spring means on said arm for biasing said plunger to maintain said latch in said notch to provide a motion transmitting connection between said arm and said member until said strut is displaced a predetermined amount to rotate said member to a point where said latch slips out of said notch to interrupt the connection between said arm and said member, and means for adjusting said spring means to vary the effective load impressed on said plunger.

References Cited in the file of this patent

UNITED STATES PATENTS

| | | |
|---|---|---|
| 507,944 | Thornycroft | Oct. 31, 1893 |
| 868,152 | Atkinson | Oct. 15, 1907 |
| 1,441,491 | Duncan et al. | Jan. 9, 1923 |
| 2,178,422 | Heagney | Oct. 31, 1939 |
| 2,329,841 | Keinath | Sept. 21, 1943 |
| 2,420,539 | Hornfeck | May 13, 1947 |
| 2,449,590 | Colpaert | Sept. 21, 1948 |
| 2,539,788 | Matcorvich | Jan. 30, 1951 |

FOREIGN PATENTS

| | | |
|---|---|---|
| 369,588 | Great Britain | Mar. 21, 1932 |
| 537,953 | Great Britain | Oct. 7, 1940 |

OTHER REFERENCES

Mechanical Engineers' Handbook, Marks, 4th edition, McGraw-Hill Book Co., N. Y., 1941, p. 477.